United States Patent
Jones et al.

[15] 3,669,299
[45] June 13, 1972

[54] MECHANICAL AND THERMAL DAMAGE PROTECTION AND INSULATION MATERIALS USABLE THEREFOR

[72] Inventors: Doyle P. Jones, Arlington, Va.; Robert C. Kohrn; Donald V. Perkins, both of South Bend, Ind.

[73] Assignee: Uniroyal, Inc.

[22] Filed: Oct. 30, 1970

[21] Appl. No.: 85,417

[52] U.S. Cl. ............................... 220/10, 161/215, 161/217, 250/108 WS, 252/62, 252/378
[51] Int. Cl. ............................................. B65d 7/22
[58] Field of Search .............. 220/10; 252/62, 378; 161/215, 161/219, 217, 225, 248; 156/79; 250/108 WS

[56] References Cited

UNITED STATES PATENTS

| | | |
|---|---|---|
| 882,678 | 3/1908 | Harry........................................220/10 |
| 1,901,556 | 9/1929 | Gottschalk............................220/10 X |
| 2,526,311 | 10/1950 | Wilson................................161/248 X |
| 3,113,215 | 12/1963 | Allen..............................250/108 WS |
| 3,407,111 | 10/1968 | Reilly....................................156/79 X |

Primary Examiner—Joseph R. Leclair
Assistant Examiner—James R. Garrett
Attorney—Norbert P. Holler

[57] ABSTRACT

Insulation material capable of providing, for any given thickness thereof, a superior combination of thermal and mechanical damage protection, as well as products incorporating such insulation, are disclosed. The insulation is an intumescent composition made from a particulate mixture of elastomeric polymeric materials, a phenolic or comparable resin, a moisture-liberating substance, and certain other additives, and produces a hard porous char of low thermal conductivity when subjected to elevated temperatures. Although the mixture may be used in granular form, it is preferably combined with an elastic or flexible resinous binder to enable the mixture to be bonded and molded to the shape required for its use. Depending on the particular application involved, the insulation may be used with or without additional protective facings. A representative product utilizing a layer of such insulation between metal facings is a container construction designed for the shipment of hazardous materials such as radioactive wastes, the construction being characterized by an inner steel drum within an outer steel drum and having the space between the drums filled with the insulation.

6 Claims, 11 Drawing Figures

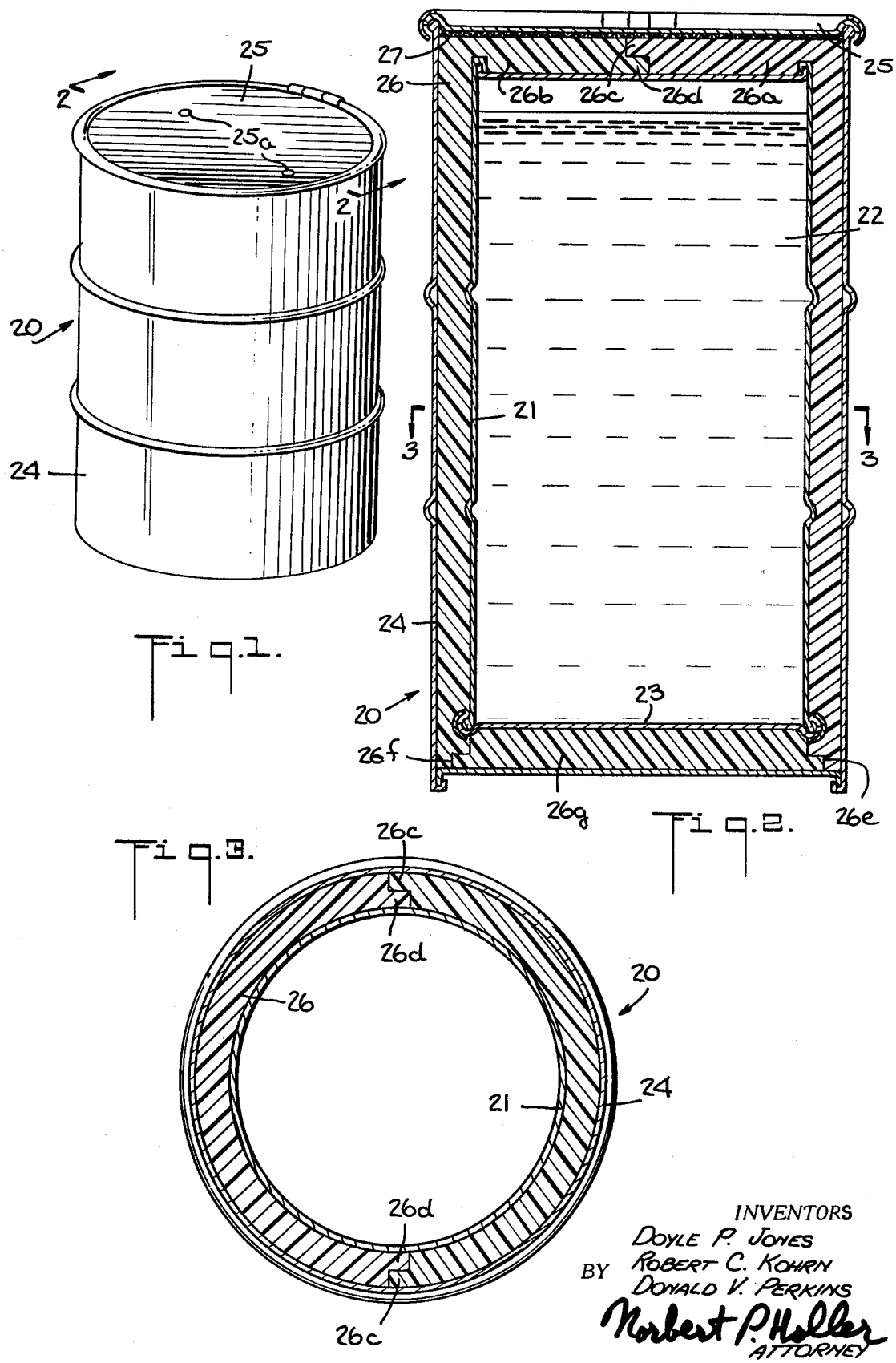

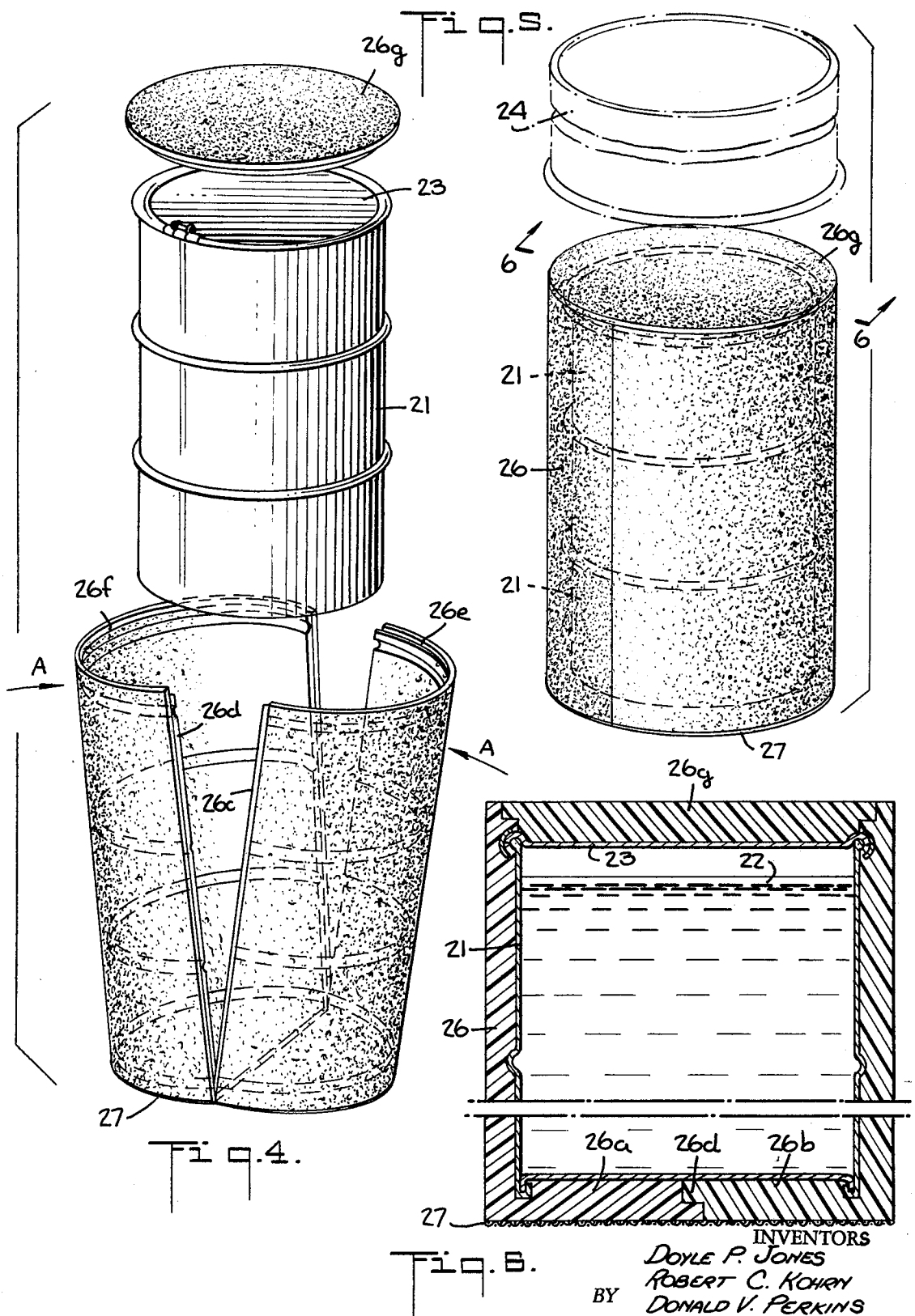

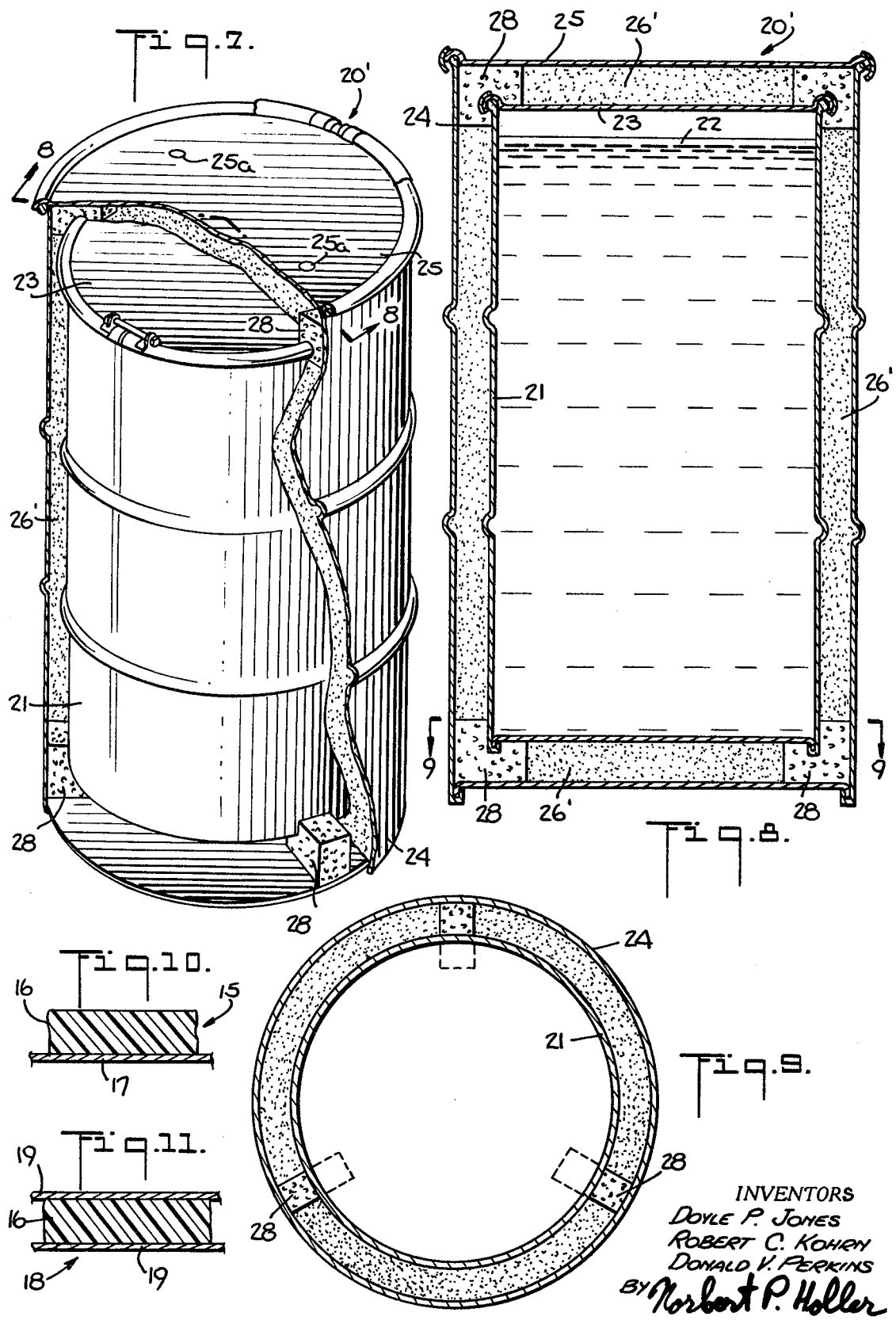

MECHANICAL AND THERMAL DAMAGE PROTECTION AND INSULATION MATERIALS USABLE THEREFOR

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to the art of protective packaging, as well as to insulating materials usable therefor.

Insulative packaging for protecting the contents thereof against damage by externally applied high temperatures and high energy impacts or shocks is frequently required in a number of diverse fields. The term "packaging" is here used broadly, to designate not only contains and substantially fully or completely surrounding enclosures, but also partial enclosures such as hoods and even such non-enclosing structures as walls and partitions. The transportation industry in particular has lately had to come to grips with this problem more than ever in view of the great increase of shipments of hazardous materials, such as dangerous chemicals, radioactive wastes, corrosive liquids, noxious and poisonous gases, etc., which shipments are increasingly becoming the subject of both local and national governmental regulations. Among the most stringent of these regulations yet enacted are those requiring a shipping container for radioactive materials to maintain its integrity over a sequential series of destructive tests, including a 30-foot drop onto an unyielding surface, a 40-inch drop onto a 6-inch diameter pin or rod mounted vertically on an unyielding surface, subjection to a temperature of about 1,500° F. for 30 minutes, and submersion under 3 feet of water for 24 hours.

It is the basic object of the present invention, therefore, to provide novel insulation materials affording superior thermal and mechanical damage protection and capable, when fabricated into a closed container, of meeting the aforesaid test requirements.

Generally speaking, the objectives of the present invention are attained by means of insulation materials in the form of an intumescent composition made from a particulate mixture of a rubbery or elastomeric polymeric material, a moisture-liberating substance, a thermosetting resin compatible with the polymeric material, and certain other additives. The specific particulate character of the starting mixture will ordinarily be determined by the intended manner of use thereof but in any event is not critical. Thus, the materials may be in the form of powders, granules, crumbs or chunks, or even preformed segments capable of being mechanically interfitted with one another or bonded together to form a complex or very large unit. Although the insulation may be used in granular form or may be molded to a desired shape at elevated pressures and temperatures, optimally it is preferred that it be combined with an elastic or flexible resinous binder to enable the mixture to be bonded and molded, without the need for high pressures or elevated temperatures, to the particular shape required for its use. The insulation in a suitably cohesive or self-supporting form may be used alone, but it is preferred to use it in the form of a composite having additional protective facings applied to one or both surfaces of the insulation. A representative product utilizing such insulation is a shipping container for hazardous materials such as radioactive wastes, the container consisting of two steel drums one within the other, the space between the drums being occupied by a layer of the insulation.

The polymeric materials adapted for use in the practice of the present invention are preferably those which are not brittle and are capable of elastically absorbing high mechanical energy impacts. Thus, the polymer component of the insulation may be a rubbery or elastomeric substance such as nitrile rubber, ethylene-propylene rubber (EPDM or EPR), styrene-butadiene rubber (SBR), chloroprene, and the like. The mixture may, of course, also comprise such additives as curatives and accelerators for the polymeric materials. These are well known to those skilled in the art and need not be itemized in detail.

The resin component of the insulation should be a substance compatible with the polymeric material and capable of enhancing the hardness of the char which is formed when the insulation is subjected to elevated temperatures. Phenolic resins are preferred, but it will be clear that other comparable materials such as melamine resins, epoxy resins, modified forms of phenolic, melamine and epoxy resins, and the like, might be used in lieu thereof.

The moisture-liberating substance, the purpose of which is to impart the property of intumescence to the mixture, may be in general any hydrated substance which will liberate water when subjected to elevate temperatures but not at temperatures up to about 250° F. or so which would be possible molding and curing temperatures for the insulation. Representative substances of this character are hydrated inorganic materials such as boric acid, sodium tetraborate, barium peroxide (hydrate), and the like, organic metallic salts such as potassium oxalate and the like, etc.

The efficacy of the insulation is a function of the fact that upon exposure to extreme temperatures, the subsurface portions of the insulation coalesce while the outer surface portions, i.e., in a dual drum container the portions of the insulation contacting the inner surface of the outer container, intumesce and form a hard, porous char. This char ensures the maintenance of structural integrity of the insulation, a result which is not attainable with conventional cork or expanded plastics insulating compositions. The resistance to the high external temperatures is a result of, and greatly enhanced by, the endothermic reactions, i.e., one or more of dehydration, vaporization of water, thermal cracking of organic materials, carbonization, etc., depending on the temperature, which take place during the decomposition of the insulation.

For the purpose of making the preferred bonded form of the insulation, binders which are generally liquids capable of solidifying and curing at either room or moderately elevated temperatures are added to the particulate mixture, to the extent of about 6 to 30 percent by weight of the total mix depending upon particle size of the latter, preferably about 15 percent, which can then be deposited into appropriate molds to enable it to assume the desired shape. Such binders should have the ability to bond readily to the particulate material and, if necessary, to wet easily and adhere to the surfaces of any highly heat and mechanical energy resistant facing material to be combined with the insulation, e.g., metals, ceramics, plastics reinforced by such substances as glass fiber, asbestos fiber, carbon or graphite, and the like, and to be characterized by some degree of flexibility or elasticity when cured. Suitable binders would be such materials as thermosetting polyether- or polyester-based polyurethane resin, phenoxy or epoxy resin modified by the addition of polyamides or polysulfides, and the like. When such a binder is used, it will be clear that the molding pressure may be negligible. The density of the bonded insulation may, of course, be varied and predetermined by suitably controlling the particle size, the initial loading of the particulate materials in the mold, and the pressure applied to the mixture in the mold during the curing operation.

The foregoing and other objects, characteristics and advantages of the present invention will be more clearly understood from the following detailed description thereof when read in conjunction with the accompanying drawings, in which:

FIG. 1 is a perspective illustration of an insulated hazardous materials shipping container embodying constructional features according to one aspect of the present invention;

FIG. 2 is a sectional view, on an enlarged scale, taken along the line 2—2 in FIG. 1;

FIG. 3 is a sectional view taken along the line 3—3 in FIG. 2;

FIG. 4 is an exploded perspective view illustrating the first stage of the assembly of the container shown in FIG. 1;

FIG. 5 is a perspective view of the structure shown in FIG. 4 but in assembled condition, and further illustrates the next stage of the assembly of the overall container;

FIG. 6 is a fragmentary sectional view, on an enlarged scale, taken along the line 6—6 in FIG. 5;

FIG. 7 is a perspective view, similar to FIG. 1, of a container embodying constructional features according to another aspect of the present invention, parts being broken away to show interior details;

FIG. 8 is a sectional view taken along the line 8—8 in FIG. 7;

FIG. 9 is a sectional view taken along the line 9—9 in FIG. 8; and

FIGS. 10 and 11 are fragmentary sectional views of some basic forms of insulation structures according to the present invention.

Referring now to the drawings in greater detail, as mentioned, the insulation in a suitably self-supporting or cohesive form may be used per se, i.e., without being combined with additional facing materials. Wherever conditions of use, environment, strength, safety, etc. dictate, on the other hand, the insulation may be used as a part of a composite 15 (FIG. 10) including a layer 16 of the insulation and a facing 17 at one surface only, or as a part of a composite 18 (FIG. 11) including a layer 16 of the insulation and facings 19 at both surfaces thereof. In any such composite, the components thereof may be bonded to each other or merely arranged in side-by-side relation, and the composite may take or be fabricated into any desired configuration.

Merely by way of example, an insulated container 20 made of a composite such as 18 and constituting a product which embodies the principles of the present invention and is designed for the shipment of hazardous materials, is shown in FIGS. 1 to 3. The container is composed of an inner steel drum 21, for example a standard 30-gallon drum, in which the material 22 being transported is enclosed, the drum including a tightly sealed cover or lie 23. The drum 21 is disposed upside down (FIG. 2) in an outer steel drum 24 (the reason for this arrangement will become clear as the description proceeds), for example a standard 55-gallon drum, the top of which is closed tightly by a cover or lid 25, and the space between the drums is occupied by a multi-section molded shell 26 made of the insulation hereinbefore described and in the form of an axially split cylinder. The two halves of the cylinder or shell 26 are provided with respective semi-circular bottoms 26a and 26b and with interfitting flanges 26c and 26d (FIG. 3) along their parting edges. Both shell halves are open at the top and provided with circumferential shoulder-forming recesses 26e and 26f on their interior surfaces to define, when the shell is assembled, an annular seat for a correspondingly peripherally flanged cover 26g (FIG. 2). At their bottoms, the shell halves are swingably interconnected by a fabric hinge 27 bonded thereto (FIG. 2), for example a 13-ounce nylon woven fabric cemented to the shell half-bottoms 26a and 26b by means of a thermosetting polyurethane resin composition.

To assemble the container 20, the halves of the insulator shell are first angularly separated from one another (FIG. 4). The inner drum 21 is now lowered right side up into the open split cylinder, the halves of the latter concurrently being swung together, as indicated by the arrows A—A, into embracing relation to the exterior of the drum, and the insulator cover 26g is then placed over the open end of the shell (FIGS. 5 and 6). The open outer drum 24 is now inverted, as shown in phantom outline in FIG. 5, and fitted over the insulator shell 26–27, whereupon the resultant assembly is inverted into the position shown in FIG. 2 and the cover 25 affixed and sealed to the drum 24.

The so-completed containers of the present invention have been found capable of withstanding the rigorous tests adverted to hereinbefore. Moreover, the successful performance characteristics of the insulator construction appear to be enhanced somewhat by the provision of the interfitting parting line edges 26c–26d and the shouldered seat 26e–26f for the flanged cover 26g (for increased safety, a more complex, somewhat zig-zag configuration, not shown, may be used for the seat and the cover edge contours), all of which coact to pose impediments to, i.e., prevent the establishment of direct flow passages for, the entry of hot gases from the outside into the interior of the shell 26. The inverted relationship of the drums also provides an added safety factor, in that the two lids face in opposite directions and each is juxtaposed to a non-openable portion of the other drum. As a special safety feature, furthermore, the outer drum 24 of the container 20 may be provided with vents 25a (FIG. 1), normally closed by blow-out or melt-out plugs preferably made of such thermoplastic materials as polyethylene, polyvinyl chloride, and the like, to enable release of decomposition gases produced by the insulation in the event of exposure thereof to high external temperatures.

It will be understood that where a prefabricated multi-section shell is used, the various parts of the shell will have been molded to dimensions and configurations required to ensure that substantially the entire space between the drums is filled with insulation. In this connection it should be noted that for purposes of simplification and economy of manufacture, as well as to facilitate assembly of the composite container, it has been found preferable to make the insulator shell of four elements (in lieu of the three shown), to wit an axially split open-ended cylinder and a pair of end caps or covers, the sections of the former thus resembling the halves of the shell 26 without the bottom portions 26a and 26b, and both end caps being peripherally profiled like the cover 26g. With this type of arrangement, of course, the shell halves, when surrounding the inner steel drum of the container, are secured to the same and each other by encircling straps or tapes. During the assembly operation, the inner drum is first placed right side up on the bottom end cap, and the cylinder halves are then secured to the inner drum, as described, with their lower profiled edges seating on the periphery of the end cap. The top end cap is then fitted onto the profiled upper edges of the cylinder halves whereupon the outer drum is fitted on in the manner set forth hereinabove in connection with FIG. 5.

Alternatively, it is also within the contemplation of the present invention that the insulation may be molded in situ, i.e., the unmolded particulate mixture having an uncured binder added thereto could be poured into the space between the two drums with the latter held in concentric spaced relation in any suitable manner, as by spacer blocks, and the binder then being permitted to cure. A more preferred approach, however, is to mold the insulator as an inner lining directly to the interior surface of the outer drum, leaving a cavity just sufficiently large to enable insertion and removal of the inner drum. For this system, of course, a cover such as 26g would have to be provided. Both the split shell method and the lining method of providing the insulation, it can be seen, have the additional advantage, vis-a-vis the in situ molding method, that the insulation can be reused in other containers once the first shipment has been completed (absent, of course, any destructive mishap against the occurrence of which the container is designed to afford protection in the first place).

Turning now to FIGS. 7 to 9, the container 20' there shown is substantially identical to the container 20 in its basic construction, including inner and outer drums 21 and 24. The principal difference between the containers 20 and 20' is that the insulation 26' filling the space between the drums is particulate in form, i.e., unbonded and unmolded, with molded insulation spacer blocks 28, for example six in number, being used to maintain the drums in properly spaced relation to each other. The drums are shown both right side up with respect to each other, but here too the drums would preferably be arranged in mutually inverted relation, for the added safety factor previously mentioned. To this end, it would merely be necessary, during the assembly operation, to invert the inner drum and insert it in that condition into the upright outer drum. It will be clear that in a container of this type the insulation should be sufficiently firmly packed or dense, i.e., with a minimum of entrapped air spaces, to minimize the possibility of portions of the insulation "sagging" and thus compacting into a smaller volume during handling of the container. Granular insulations with a particle size as high as about one-fourth inch and as low as about one thirty-second inch are presently deemed most advantageous to use.

Merely by way of example, a resin-bonded insulation shell which has been efficaciously used in a dual-drum container according to the present invention had the starting composition given in the following table, the mixture having a one-fourth inch particle size and being intimately admixed with 15 percent by weight of a room temperature liquid polyether-based urethane polymer (polytetramethyleneglycol polyurethane) and a curative therefor (methylene-bis-orthochloroaniline) in the ratio of 100 parts to 11 parts.

| Ingredient | Parts By Weight |
| --- | --- |
| Nitrile rubber | 100 |
| Phenolic resin | 120 |
| Boric acid | 80 |
| Zinc oxide (no lead) | 5 |
| Stearic acid | 2 |
| Tetramethyl thiuram disulfide | 1 |

The last three listed components are conventional curing agents or additives, but experiments have shown that they may actually be omitted from the mixture since the phenolic resin will, given appropriate conditions known in the art, cross-react by itself. Among the three major components of the mixture, using 100 parts of elastomer as the reference level, the phenolic (or like) resin content may be varied between about 70 and 125 parts, while the content of the water-liberating substance may vary between about 60 and 120 parts.

It will be understood that the foregoing description of preferred embodiments of the present invention is for purposes of illustration only, and that the various structural features and relationships, as well as the proportions and ranges of components to be used, herein disclosed are susceptible to a number of modifications and changes none of which entails any departure from the spirit and scope of the present invention as defined in the hereto appended claims. Thus, the protective packaging of the present invention could be used in such applications as thermal shielding on both military and civilian vehicles, e.g., tanks, ships, etc. for protection of men and materials, as well as on safes and vaults for protection of valuables, in conjunction with furnaces and other high temperature industrial and non-industrial installations, and the like. In such applications it would normally be preferred, due to the sizes and complexity of the shapes involved, to use preformed segments of the insulation and to fit and bond or otherwise secure these together as required. Also, although the containers 20 and 20' have been described as steel drums, they could be in the form of other receptacles as well.

Having thus described our invention, what we claim and desire to protect by Letters Patent is:

1. A shipping container providing both thermal and mechanical damage protection, comprising a first receptacle for containing the material being shipped, a second receptacle larger than said first receptacle, said first receptacle being disposed within said second receptacle, and an insulation composition occupying the space between said receptacles, said composition being resistant to high energy impacts and capable of forming a hard, porous char of low thermal conductivity upon being subjected to high temperatures, and said composition comprising an intumescent particulate mixture of an elastomeric polymeric material, a thermosetting resinous material compatible with said polymeric material, a moisture-liberating substance, and a cured thermosetting resinous binder dispersed throughout said mixture, said binder having the properties of flexibility and elasticity and bonding said mixture into a cohesive entity, said entity being molded to the contours of said space.

2. A container according to claim 1, wherein both said receptacles are steel drums.

3. A container according to claim 1, wherein said insulation composition is in the form of a lining molded to the inner surface of said second receptacle.

4. A container according to claim 1, wherein said insulation composition is in the form of a split, multi-section structure capable of being assembled in closely surrounding relation to said first receptacle prior to insertion into said second receptacle.

5. A shipping container providing both thermal and mechanical damage protection, comprising a first receptacle for containing the material being shipped, a second receptacle larger than said first receptacle, said first receptacle being disposed within said second receptacle, and an insulation composition occupying the space between said receptacles, said composition being resistant to high energy impacts and capable of forming a hard, porous char of low thermal conductivity upon being subjected to high temperatures, and said composition comprising an intumescent particulate mixture of an elastomeric polymeric material, a thermosetting resinous material compatible with said polymeric material, and a moisture-liberating substance.

6. A container according to claim 5, wherein both said receptacles are steel drums.

* * * * *